(12) United States Patent
Maxwell et al.

(10) Patent No.: US 6,170,843 B1
(45) Date of Patent: Jan. 9, 2001

(54) TRAILER HITCH STEP

(76) Inventors: Bobby Maxwell; Robert Maxwell, both of 305 E. Don St., Ruleville, MS (US) 38271

( * ) Notice: Under 35 U.S.C. 154(b), the term of this patent shall be extended for 0 days.

(21) Appl. No.: 09/358,226

(22) Filed: Jul. 21, 1999

(51) Int. Cl.$^7$ .................................................. B60R 3/00
(52) U.S. Cl. ............................................ 280/166; 182/91
(58) Field of Search ................................. 182/88, 89, 91, 182/92; 280/163, 164.1, 165, 166

(56) References Cited

U.S. PATENT DOCUMENTS

| | | | |
|---|---|---|---|
| 3,266,594 | * | 8/1966 | Antosh et al. ........................ 182/91 |
| 3,572,753 | * | 3/1971 | Claassen ............................. 280/166 |
| 3,758,134 | * | 9/1973 | Stewart .............................. 280/163 |
| 5,007,654 | * | 4/1991 | Sauber ............................... 280/166 |
| 5,513,866 | * | 5/1996 | Sisson ............................... 280/166 |
| 5,617,930 | * | 4/1997 | Elia ................................... 182/97 |
| 5,716,064 | * | 2/1998 | Frerichs ............................. 280/166 |
| 5,732,966 | * | 3/1998 | Graffy et al. .................... 180/166 X |
| 5,738,362 | * | 4/1998 | Ludwick ............................. 280/166 |
| 5,803,475 | * | 9/1998 | Dick .................................. 280/163 |
| 5,897,125 | * | 4/1999 | Bundy ............................... 280/166 |

* cited by examiner

*Primary Examiner*—Michael Mar
(74) *Attorney, Agent, or Firm*—Gordon E. Baird

(57) ABSTRACT

A step holding member has a first end which is insertable into a receiver-type trailer hitch and a second end which is adapted for holding a step member for stepping onto the tailgate of a pickup truck. In another embodiment of the invention the step holding member telescopes in and out towards a side of a pickup truck allowing for easy storage when telescoped in. In a third embodiment the step holding member folds inwards from the pickup towards the trailer hitch for storage. A fourth embodiment is adapted for mounting directly onto a trailer hitch drawbar so that the hitch may be used for towing with the step in place for use.

3 Claims, 5 Drawing Sheets

TRAILER HITCH STEP

BACKGROUND OF THE INVENTION

1. Field of the Invention

This invention relates generally to a step for a vehicle, and more particularly, to a step attached to a receiver type trailer hitch at the rear of a pickup truck to aid a person stepping into and out of the vehicle, especially with the tailgate of the pickup down.

2. Description of Related Art

With the increased use of relatively large pickup trucks, there exists a need for an inexpensive and easy to use step to aid persons in entering and leaving the rear of such vehicles when the tail gate is down. The step of the present invention is inexpensive to manufacture and assemble, and it is convenient to use to step onto the tailgate of a pickup truck. While foldup and sliding steps are known for trucks and other vehicles, such steps are limited for attachment to bumpers or for permanent attachment to a vehicle, and such known step do not meet the need of all users.

U.S. Pat. No. 5,803,475 to Dick describes folding steps connected to a drawbar which inserts into a receiver hitch on one end and has legs which rest on the ground on the other end. It is intended for use for entry into a camper mounted on a pickup. U.S. Pat. No. 5,738,362 to Ludwick describes a step which is insertable into a receiver type hitch and rotates under the drawbar when not in use. This device cannot be utilized when the tailgate is down. U.S. Pat. No. 5,007,654 to Sauber describes vehicle steps which mount onto a truck body. U.S. Pat. No. 5,617,930 to Elia describes a ladder which can be secured to the inner surface of the tailgate of a truck to permit access to to the bed of the truck when the tailgate is down. U.S. Pat. No. 5,732,996 to Graffy et. al. describes a step which permanently attaches to the tailgate of a pickup. None of these patents, however, whether taken alone or in proper combination, show the trailer hitch step of the present invention.

SUMMARY OF THE INVENTION

One object of the invention is to provide a step capable of being inserted into a receiver-type trailer hitch on a pickup truck enabling a user to step onto the tailgate of a pickup truck when the tailgate is in the down position.

Another object of this invention is to provide a step which will telescope toward the trailer hitch and be secured when not in use.

Another object of this invention is to provide a step which will fold inwards from the side of a pickup towards the trailer hitch and be secured when not in use.

Another object of this invention is to provide a step that can be attached to an existing ball mount drawbar thus allowing for use of a trailer ball mounted to the drawbar for towing purposes as well as providing easier access into the bed area of a pickup but also allowing for easy removal of the trailer hitch step when desired.

Another object of this invention is to provide a step which is sturdy and economical to manufacture.

DESCRIPTION OF THE PREFERRED EMBODIMENTS

Figure 1:
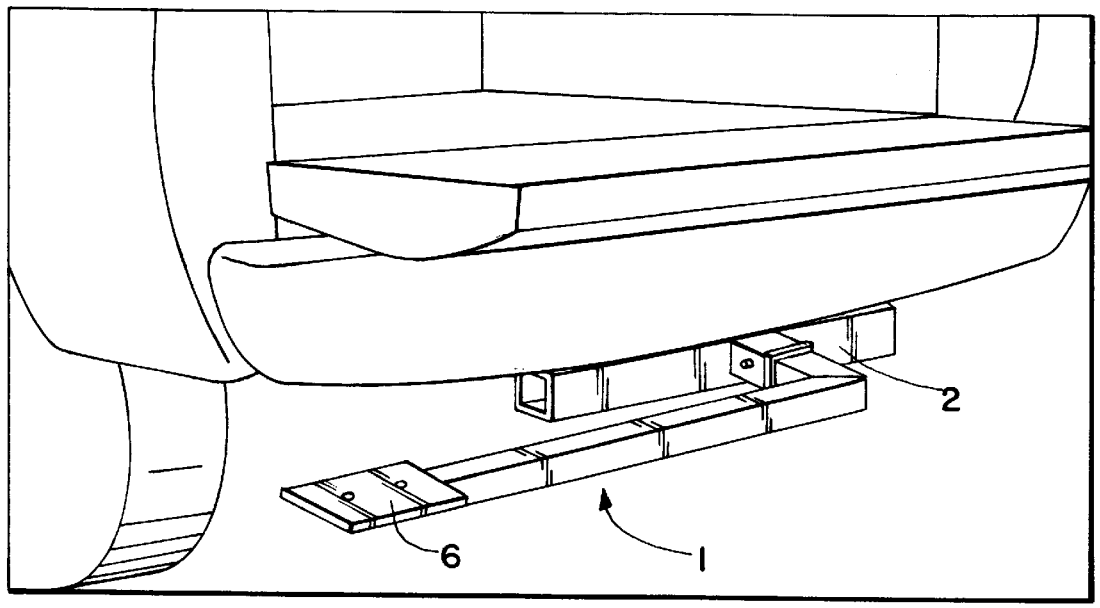
FIG. 1 shows the trailer trailer hitch step deployed in a receiver type trailer hitch which is mounted on the rear of a pickup truck.
Figure 2:
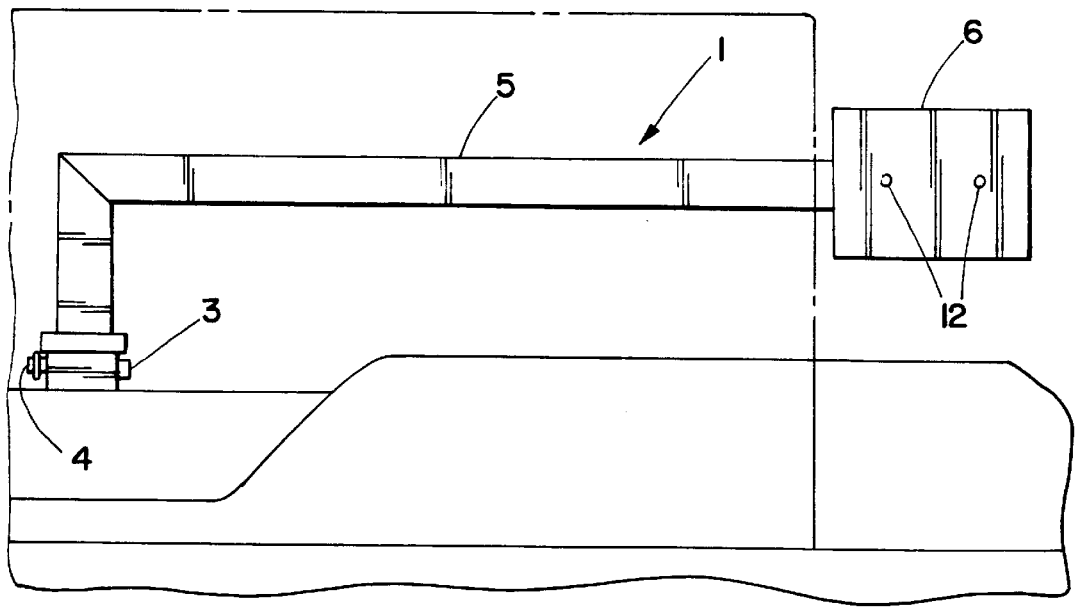
FIG. 2 shows the trailer hitch step mounted in a receiver type trailer hitch as viewed from above when mounted on the rear of a pickup truck.
Figure 3:
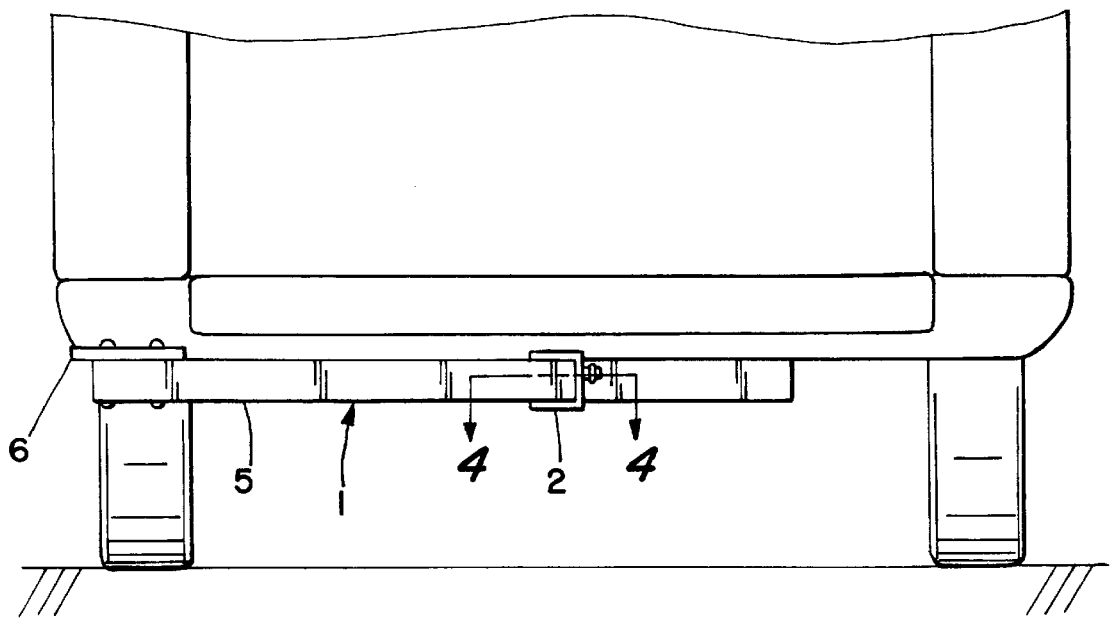
FIG. 3 is an end view of the trailer hitch step which is mounted in a receiver hitch which is attached to the rear of a pickup truck.

Referring now to the drawings, FIG. 1 through FIG. 4 shows the a first embodiment of the trailer hitch step, In FIG. 1 through FIG. 3 the trailer hitch is shown deployed in a receiver type trailer hitch. Reference numeral 1 indicates the trailer hitch step as a whole, while reference numeral 2 indicates a receiver type trailer hitch into which the trailer hitch step is installed. Reference numeral 3 indicates a clevis pin which secures the trailer hitch step to the receiver type trailer hitch. The clevis pin is secured by clip 4 which is shaped like a hairpin with one leg of the pin going through a hole in the shaft of the clevis pin. Reference numeral 5 indicates an L-shaped arm upon which step 6 is attached. The L-arm can be fabricated from two inch outside diameter square steel tubing having a wall thickness suitable for supporting the weight of a man standing on the step. Fabrication is accomplished by cutting two pieces of two inch steel tubing at a 45-degree angle and welding the two pieces together to form the L-arm. The step member can be fabricated from a piece of material such as steel or diamond plate aluminum having a non-slip surface. Reference numeral 12 indicates a method for attaching the step member to the L-shaped arm such as bolts and nuts, welding or such.

Figure 4:
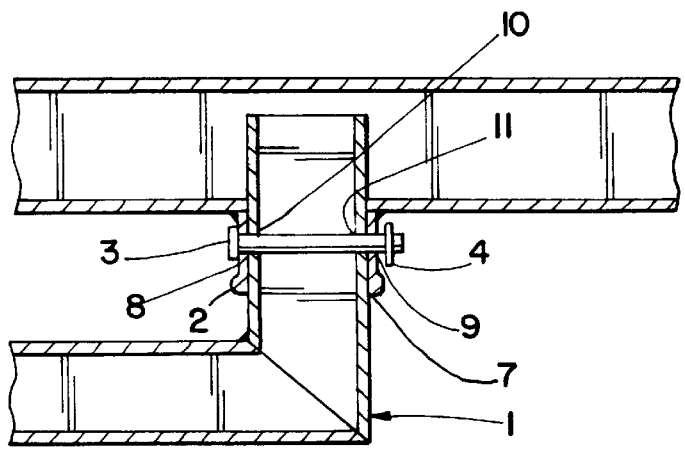
FIG. 4 is a view in section of the trailer hitch step mounted in a receiver hitch taken along lines 4—4 in FIG. 3.

FIG. 4 is a top sectional view taken along lines 4—4 in FIG. 3. It shows details of the attachment of the trailer hitch step to the receiver hitch. The trailer hitch step 1 is inserted into the generally rectangular opening 7 of receiver type trailer hitch 2. Clevis pin 3 is inserted through holes 10 and 11 of the trailer hitch step which are colinear with holes 8 and 9 of the receiver hitch. Clip 4 is inserted through a hole in the clevis pin to prevent the clevis pin from falling out of the holes.

Figure 5:
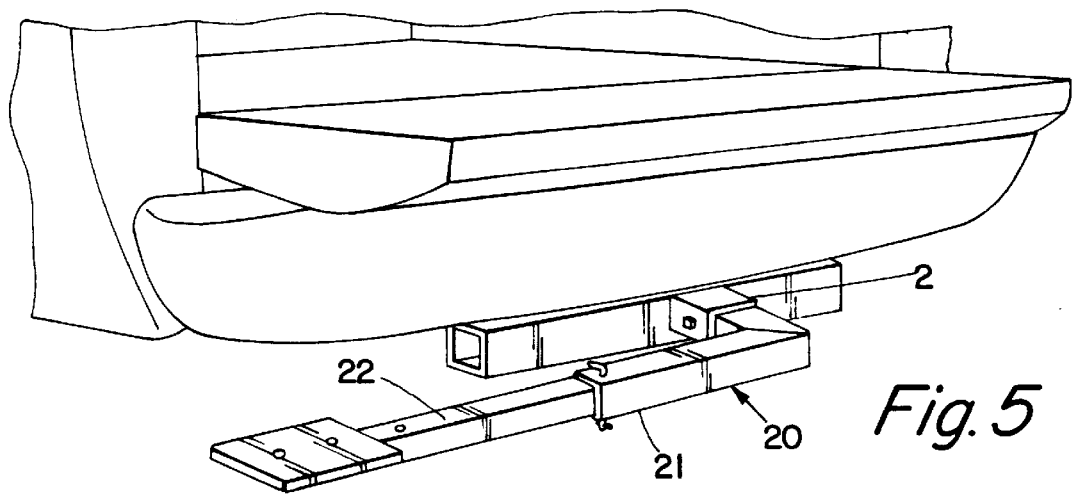
FIG. 5 is a view of a second embodiment of a trailer hitch step deployed in a receiver type trailer hitch which is mounted on the rear of a pickup truck wherein the trailer hitch step can be telescoped outward for use and inward when not in use.

FIGS. 5 through 8 show a second embodiment of the trailer hitch step. FIG. 5 is a perspective view showing step 20 inserted into receiver hitch 2. Extension arm 22 extends out of L-arm 21 past the side of the deployed tailgate for use of the step and slides back in for storage when not in use.

Figure 6:
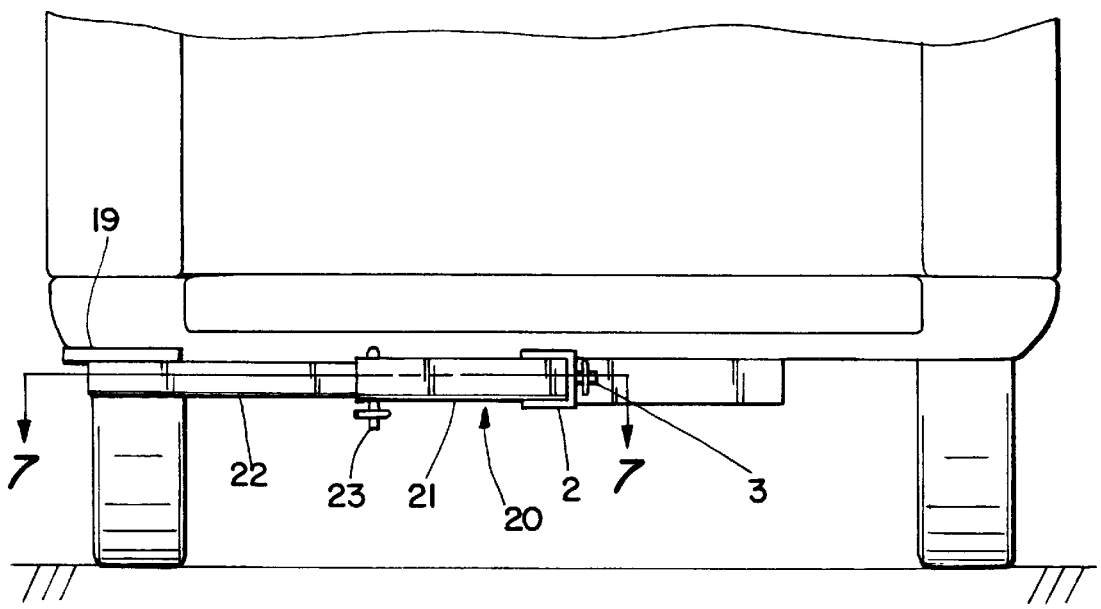
FIG. 6 an end view of the second embodiment of the trailer hitch step mounted in a receiver hitch which is attached to the rear of a pickup truck.

FIG. 6 is an end view showing L-shaped arm 21 secured in the receiver hitch by clevis pin 3. Extension arm 22 is slideably inserted into the L-shaped arm and supports step 19. Clevis pin 23 secures the extension arm to the L-shaped arm. The extension arm supports step member 19. The L-arm is fabricated from steel tubing having a nominal extension dimension of two inches. The extension arm is fabricated from a square tubing whose external dimension is slightly smaller than the internal dimension of the square tubing comprising the L-arm.

Figure 7:
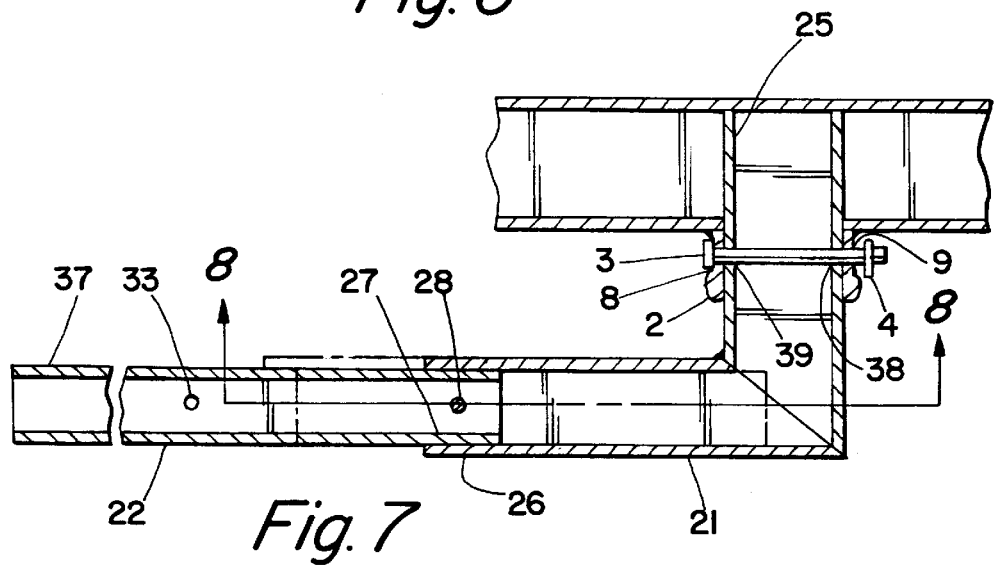
FIG. 7 is a view in section of the second embodiment of the trailer hitch step mounted in a receiver hitch taken along lines 7—7 in FIG. 6.

FIG. 7 is a top sectional view of the second embodiment taken along lines 7—7 of FIG. 6. L-shaped arm 21 has a first end 25 which is secured in receiver hitch 2 by clevis pin 3 which passes through holes 8 and 9 of the receiver hitch and holes 38 and 39 of the first end of the L-shaped arm. The L-shaped arm has second end 26 into which first end 27 of extension arm 22 is slideably inserted.

Figure 8:
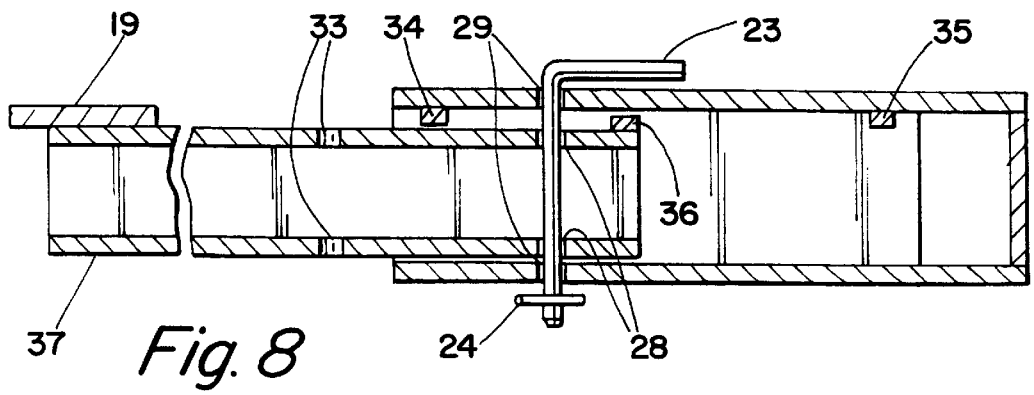
FIG. 8 is a view in section of the trailer hitch step of taken along lines 8—8 in FIG. 7.

FIG. 8 is an end sectional view taken along lines 8—8 in FIG. 7. Second end 37 of extension arm 22 supports step 19 which is attached to the extension arm. The extension arm is secured to L-shaped arm 21 by clevis pin 23 which passes through holes 29 of the L-shaped arm and colinear holes 28 of the extension arm. Clip 24 secures the clevis pin from accidental removal. When the extension arm is telescoped back into the L-shaped arm, holes 33 align with holes 29 to allow securing of the extension arm with a clevis pin in the collapsed configuration. Stops 34 and 35 on the inner surface of the top of the L-shaped arm are disposed to engage stop 36 on the extention arm to prevent removal of the extension arm from the L-shaped arm when clevis pin 23 is not inserted.

Figure 9:
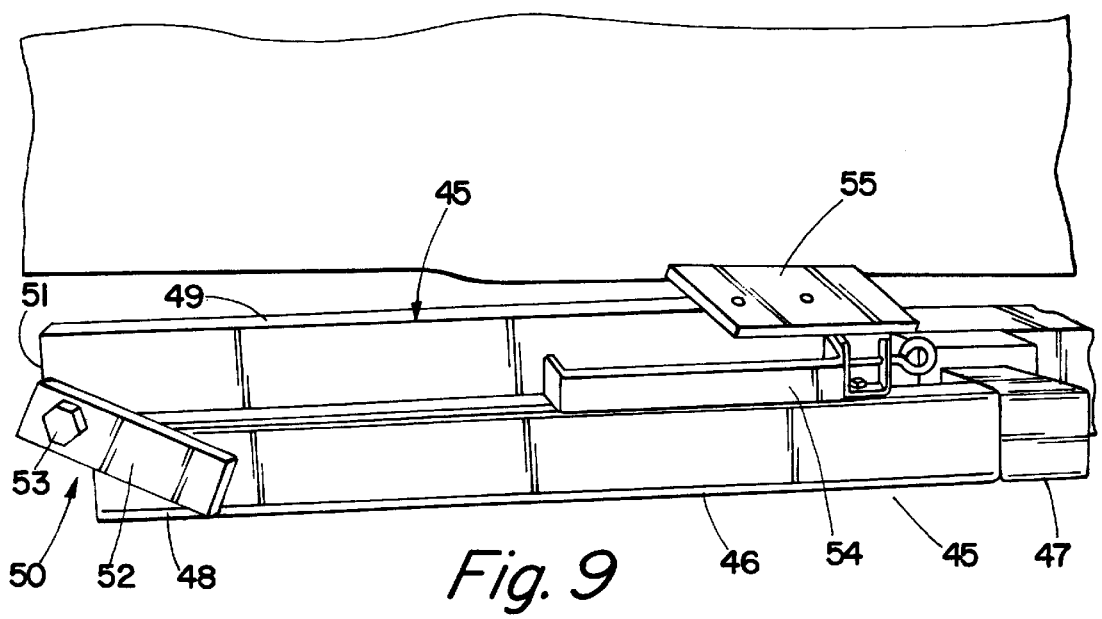
FIG. 9 shows of a third embodiment of a trailer hitch step deployed in a receiver type trailer hitch wherein the trailer hitch step can be folded inward, as shown in the Figure, when not in use.
Figure 10:
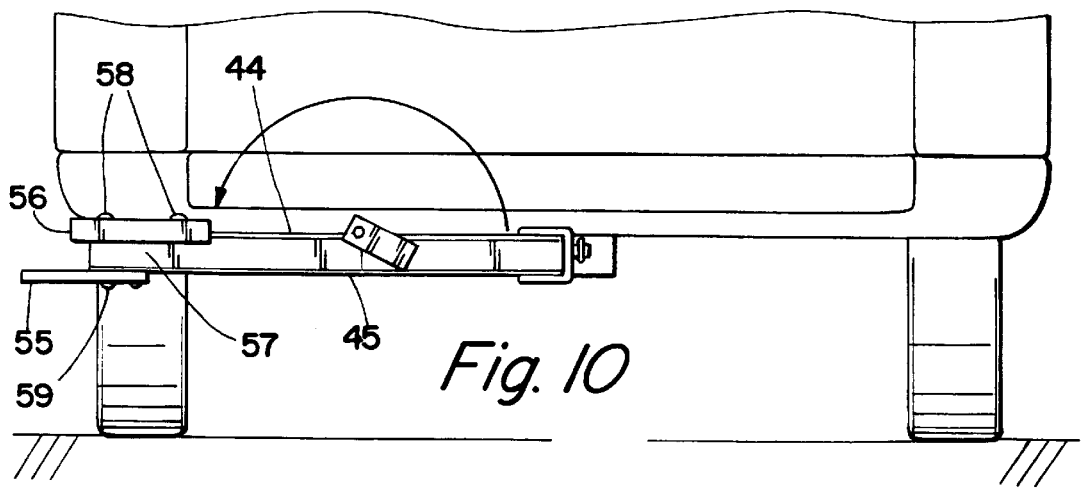
FIG. 10 shows the trailer hitch step of FIG. 9 deployed in a receiver type trailer hitch unfolded for use in stepping onto the pickup tailgate or bed.
Figure 11:
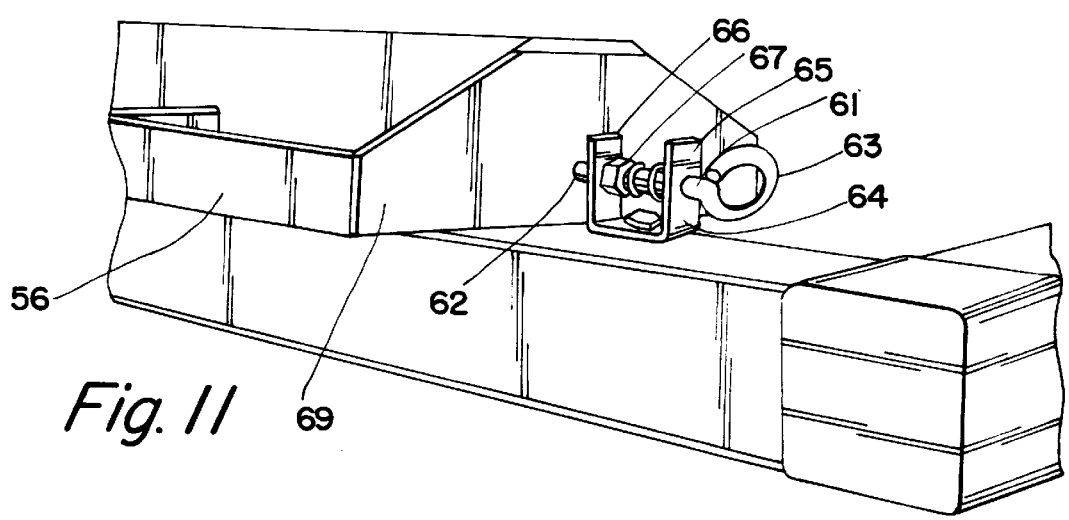
FIG. 11 shown a mechanism for securing the trailer hitch step of FIG. 9 and FIG. 10 when folded.

FIG. 9 through FIG. 11 show a third embodiment of the trailer hitch step in which the arm supporting the step is hinged to permit the step to be folded out of the way when the tailgate is up so that the step will be out of the way if the trailer hitch step is not removed when the pickup truck is driven.

In FIG. 9 reference numeral 45 indicates the trailer hitch step as a whole. First arm 46 is L-shaped and has a first end 47 which is adapted to fit into and attach to a receiver hitch and a second end 48 to which second arm 49 is attached with a hinge 50. First end 51 of the second arm is connected to the second end of the first arm by said hinge means which consists of a pair of plates 52 which are welded to opposing exterior sides of the second end of the L-shaped arm. Bolt 53 extends through a pair of holes in the pair of plates and a colinear pair of holes in the first end of the second arm to form the hinge. The bolt can be secured with a nut welded onto the threaded end of the bolt. The second arm has first side 44 and second side 45. Second step member 55 is attached to said second side of said second arm enabling the user to step into the pickup truck bed when the trailer hitch step is folded up as shown in FIG. 9.

FIG. 10 is a perspecitve view showing the trailer hitch step on a pickup truck in the unfolded position. First step member 56 is attached to the first side of the second arm; the first step member enables the user to step onto the tailgate when the trailer hitch step is unfolded as shown in FIG. 10. First step member is secured to the second end of the second arm by attaching means 58. Second step member is similarly secured to said second end of said second arm by attaching hardware 59.

FIG. 11 shows a mechanism for securing the second arm when it is in the folded position. First step member 56 is shown in the folded position where the securing mechanism comprises eyebolt 61 having threaded end 62 and eye end 63 is disposed within U-shaped bracket 64 having first leg 65 and second leg 66 wherein the U-shaped bracket is attached to the upper surface of L-shaped arm 46 with spring 67 longitudinally coiled around the threaded end with the spring disposed between first leg 65 and nut 67 which is threaded onto the threaded end of the eyebolt. The nut is forced against the second leg of the U-shaped bracket and the second end 62 of the eyebolt 61 is forceably disposed in aperature 68 in end plate 69 of first step member 56, securing the first step member. Pulling on first end 63 of the eyebolt will move the eyebolt to release the second arm so that it may be unfolded.

Figure 12:
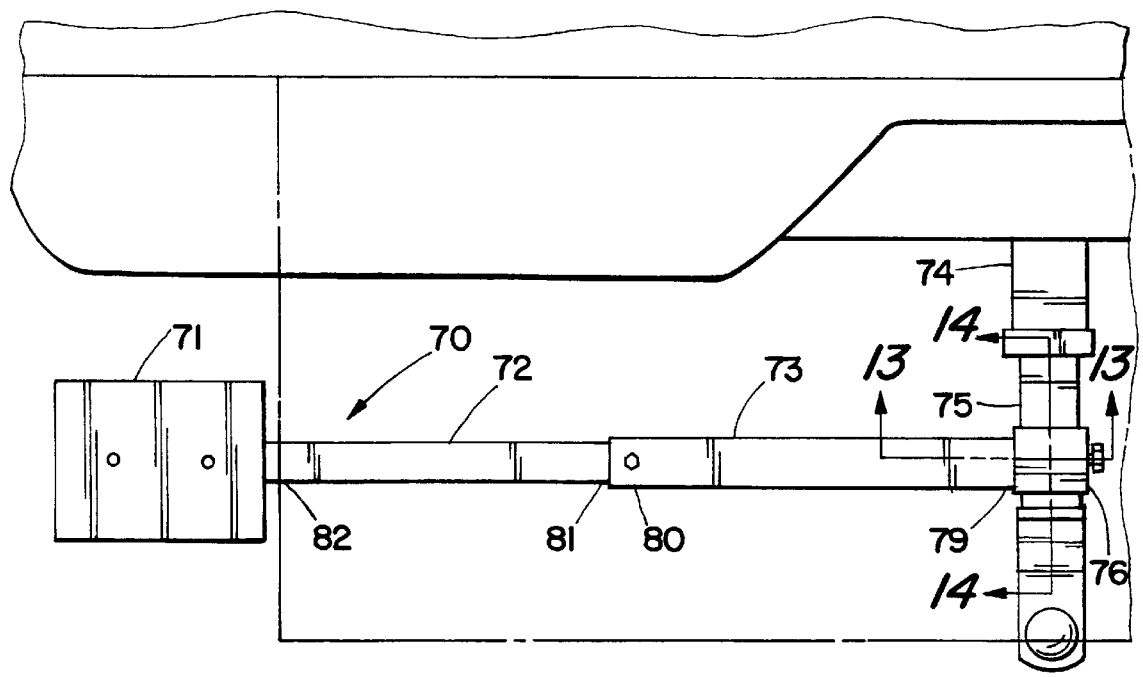
FIG. 12 shows a fourth embodiment of the trailer hitch step deployed upon the drawbar of a receiver type trailer hitch.

FIG. 12 is a perspective view showing a fourth embodiment of the trailer hitch step which mounts directly onto a draw bar which is mounted in a receiver type trailer hitch. Reference numeral 70 indicates the trailer hitch step as a whole while reference numeral 75 indicates a drawbar onto which the trailer hitch step is mounted. The drawbar is mounted into receiver type trailer hitch 74. The trailer hitch step comprises first arm 73 which has first end 79 to which sleeve 76 is attached and second end 80 into which first end 81 of extension arm 72 is inserted with step means 71 attached to second end 82 of said extension arm. The drawbar is inserted through the sleeve by which the trailer hitch step as a whole is supported. The sleeve is formed of square steel tubing whose interior dimension is slightly larger than the exterior size of the drawbar. The extension arm is telescopically received within the second end of the first arm as described above for the second embodiment.

Figure 13:
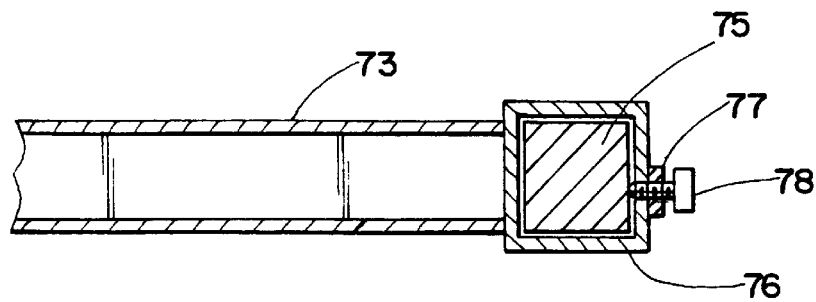
FIG. 13 is a view in section of the fourth embodiment of the trailer hitch step mounted in a receiver hitch taken along lines 13—13 in FIG. 12.

FIG. 13 is an end sectional view taken along lines 13—13 of FIG. 12. Drawbar 75 is disposed through sleeve 76. Threaded nut 77 is welded to the sleeve, and bolt 78 is screwed through the nut and a hole in said sleeve and against the drawbar to secure the trailer hitch step to the drawbar.

Figure 14:
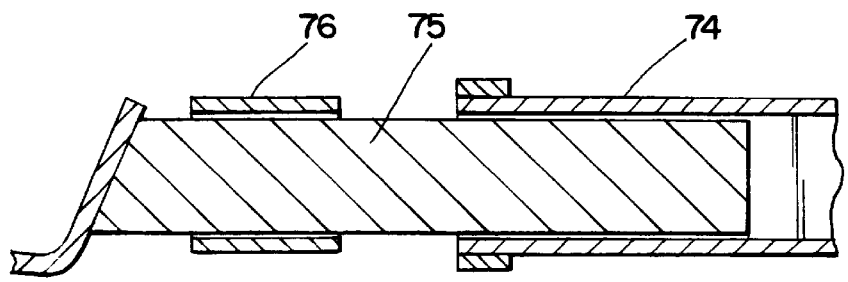
FIG. 14 is a view in section of the fourth embodiment of the trailer hitch step mounted in a receiver hitch taken along lines 14—14 in FIG. 12.

FIG. 14 is a side sectional view taken along lines 14—14 of FIG. 12. Drawbar 75 passes through sleeve 76 and into receiver hitch 74.

We claim:

1. A trailer hitch step assembly adapted for mounting onto a drawbar of a receiver hitch comprising:

a first arm formed from tubing and having a first end and a second end, a second arm formed from tubing and having a first end and a second end, said first end of said second arm being telescopically received within said second end of said first, a step member attached to said second end of said second arm, a coupling assembly for securing said first end of said first arm to the drawbar with said first and second arms extending transversely to a longitudinal axis of said drawbar, said coupling assembly including a sleeve attached to said first end of said first arm, said drawbar being slidably received within said sleeve, and a first locking member for securing said sleeve in a selected longitudinal position of adjustment relative to said drawbar, and a second locking member for securing said second arm to said first arm in a plurality of positions as said first end of second arm is telescoped into and out of said second end of said first arm whereby a user may use said step member to step onto a tailgate of a pickup truck when said second arm is telescoped outwardly to one side of the pickup truck.

2. A trailer hitch step as in claim 1 wherein the first arm is comprised of tubing which is essentially rectangular in cross section, and the second arm is comprised of tubing which is essentially rectangular in cross section and adapted to the telescope within said first arm.

3. A trailer hitch step assembly comprising:

a first arm having an L-shape with first and second intersecting arm portions, said first arm portion having a free end adapted to be secured within a receiver of a trailer hitch;

a second arm having a first end and a second end, said second arm further having vertically opposed first and second sides;

a hinge for pivotally connecting the first end of said second arm to a free end of said second arm portion for movement between a folded position in which the second arm is positioned directly above the second arm portion, and an unfolded position in which the second arm extends laterally outwardly from the second arm portion to form a continuous linear support member;

a securing mechanism for securing said second arm to said second arm portion while in the folded position;

a first step member attached to the first side of said second arm adjacent said second end; and a second step member attached to the second side of said second arm adjacent said second end, whereby a user may step upon the first step member when the second arm is deployed in the unfolded position and a user may step upon the second step member when the second arm is deployed in the folded position.

* * * * *

UNITED STATES PATENT AND TRADEMARK OFFICE
CERTIFICATE OF CORRECTION

PATENT NO. : 6,170,843 B1
DATED : January 9, 2001
INVENTOR(S) : Maxwell, et al.

It is certified that error appears in the above-identified patent and that said Letters Patent is hereby corrected as shown below:

<u>Title page,</u>
Item [76], should read -- Bobby Maxwell; Robert Maxwell, both of 305 E. Don St., Ruleville, MS (US) 38771 --

Signed and Sealed this

Second Day of October, 2001

Attest:

NICHOLAS P. GODICI
Attesting Officer   Acting Director of the United States Patent and Trademark Office